(12) United States Patent
Kiviniitty

(10) Patent No.: US 6,561,490 B2
(45) Date of Patent: May 13, 2003

(54) ROPE PULLEY CONSTRUCTION

(75) Inventor: Ari Kiviniitty, Hämeenlinna (FI)

(73) Assignee: KCi Konecranes International PLC, Hyvinkää (FI)

(*) Notice: Subject to any disclaimer, the term of this patent is extended or adjusted under 35 U.S.C. 154(b) by 0 days.

(21) Appl. No.: 09/727,517

(22) Filed: Dec. 4, 2000

(65) Prior Publication Data

US 2001/0004111 A1 Jun. 21, 2001

(30) Foreign Application Priority Data

Dec. 21, 1999 (FI) .............................................. 19992749

(51) Int. Cl.⁷ ................................................ B66D 3/04
(52) U.S. Cl. ........................ 254/411; 254/409; 254/415
(58) Field of Search ................. 254/389, 390, 254/405, 406, 409, 411, 415

(56) References Cited

U.S. PATENT DOCUMENTS

| | | | |
|---|---|---|---|
| 1,424,503 A | | 8/1922 | Manges |
| 1,559,768 A | * | 11/1925 | Olinger ...................... 254/390 |
| 2,332,389 A | * | 10/1943 | Manney ...................... 254/409 |
| 3,199,841 A | | 8/1965 | McKean |
| 3,250,516 A | * | 5/1966 | Silberger .................... 254/409 |
| 3,265,363 A | * | 8/1966 | Perez ......................... 254/390 |
| 5,154,401 A | * | 10/1992 | Schramm et al. ........... 254/390 |
| 5,398,433 A | * | 3/1995 | Dretzka ...................... 254/390 |
| 5,538,224 A | | 7/1996 | Powell et al. |

FOREIGN PATENT DOCUMENTS

| | | | |
|---|---|---|---|
| DE | 919805 | 11/1954 | |
| DE | 3405759 | 8/1985 | |
| EP | 0510432 A1 | 10/1992 | |
| FR | 588920 | * 5/1925 | ................. 254/390 |
| FR | 1300759 | 12/1962 | |
| SE | 144124 | * 2/1954 | ................. 254/390 |
| SU | 130656 | * 1/1958 | ................. 254/390 |

* cited by examiner

Primary Examiner—Emmanuel Marcelo
(74) Attorney, Agent, or Firm—Birch, Stewart, Kolasch and Birch, LLP

(57) ABSTRACT

A rope pulley construction comprising a frame, at least one rope pulley equipped with a rope groove, rope pulley bearing, guard to prevent a lifting rope from coming off the rope pulley, and suspension point for hanging the rope pulley. The frame of the rope pulley construction comprises two plate parts joined together which simultaneously provide suspension for the rope pulley, at least one suspension point for hanging the rope pulley construction and guard to prevent a lifting rope from coming off the rope pulley.

17 Claims, 2 Drawing Sheets

ROPE PULLEY CONSTRUCTION

Figure 1:
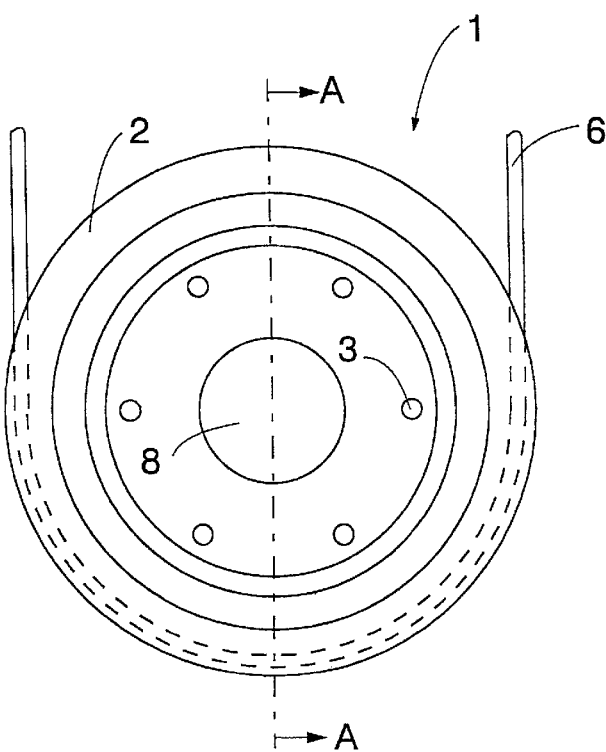

The invention relates to a rope pulley construction comprising a frame, at least one rope pulley equipped with a rope groove, rope pulley bearing, guard to prevent a lifting rope from coming off the rope pulley, and suspension point.

Publication DE-3 405 759 discloses a rope pulley construction comprising at least one rope pulley, side casings attached on both sides of the rope pulley to a hollow bearing shaft, and a flexible fixing part for hanging the rope pulley construction. Circularly symmetrical openings are arranged in the side casings at a bearing shaft. A fixing mechanism is drawn through the hollow bearing shaft and the openings in the side supports, the openings being shaped to support the flexible fixing part. The rope pulley construction disclosed in the publication further comprises a separate guard arranged on top of the rope pulley to prevent a lifting rope from coming off the rope pulley, and side plates supporting the fixing part arranged on both sides of the construction. Fixing screws are used for assembling the rope pulley construction. A drawback of the rope pulley construction disclosed in the publication is that the construction is complex, comprising a great number of parts, which increases costs and assembly time.

A characteristic of the known rope pulleys is that when the rope winds onto the rope pulley, a sector formed by the contact area is then smaller than half the rim of the rope pulley. Consequently, the point of application of the resultant force of the rope force is located below the rope pulley center in a hook block, for example. If the shaft of the hook block is hung at the center of the rope pulley, the result is a labile construction, which is emphasized particularly with zero load when the weight of the hook block itself is small. Attempts have been made to eliminate the problem with balance by fixing the shaft of the hook block below the rope pulley, but then the height of the hook block increases too much at the expense of the lifting height. Another alternative is to hang the hook block lower by a separate suspension piece, which, however, increases the weight and number of parts of the construction.

An object of the present invention is to provide a rope pulley construction which has a simple structure and which can be suspended in a preferred manner.

A rope pulley construction of the invention is characterized in that the frame comprises two plate parts joined together such that the joined plate parts provide suspension for the rope pulley, at least one suspension point and guard to prevent the lifting rope from coming off the rope pulley.

The idea underlying the invention is that in a rope pulley construction comprising a frame, at least one rope pulley and its bearing, guard to prevent a lifting rope from coming off the rope pulley, and suspension point for hanging the rope pulley, the frame comprises two plate parts joined together to simultaneously provide suspension for the rope pulley, at least one suspension point for fixing the rope pulley construction on a hook block, for example, and guard to prevent a lifting rope from coming off the rope pulley. According to a preferred embodiment of the invention, the joined plate parts are identical. According to a second preferred embodiment of the invention, the rope pulley is implemented as a rope groove ring wherein the rope pulley and the bearing are combined such that the rope groove is arranged directly on the outer rim of the bearing. According to a third preferred embodiment of the invention, the suspension point of the rope pulley construction is located asymmetrically with respect to the center of the rope pulley.

The rope pulley construction described in the invention is simple, comprising only few parts, which means that the construction is lightweight. The two parts joined together provide the suspension for the rope pulley, suspension point for supporting the suspension shaft, and guard to prevent a lifting rope from coming off the rope pulley. Being identical, the plate parts are cost-efficient to manufacture. Furthermore, the rope pulley construction is quick and simple to assemble. The suspension of the suspension shaft is also stable since the location of the suspension shaft can be chosen with respect to the location of the resultant of the rope force. Furthermore, in the rope pulley construction of the invention, the outside diameter of the bearing can be increased to almost equal the winding diameter of the lifting rope, which enables a reliable and long-run bearing to be achieved.

Figure 2:
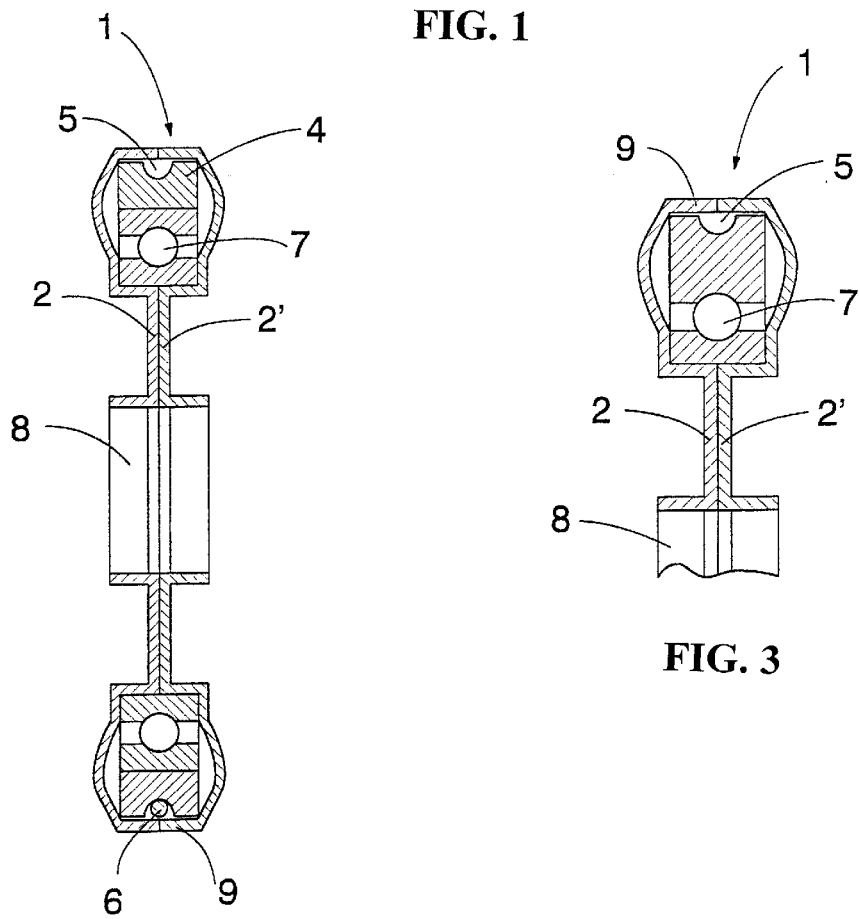
Figure 3:
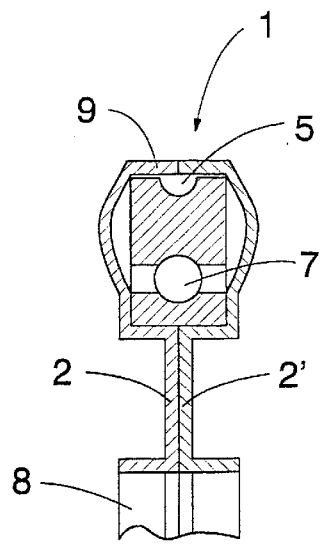
Figure 4:
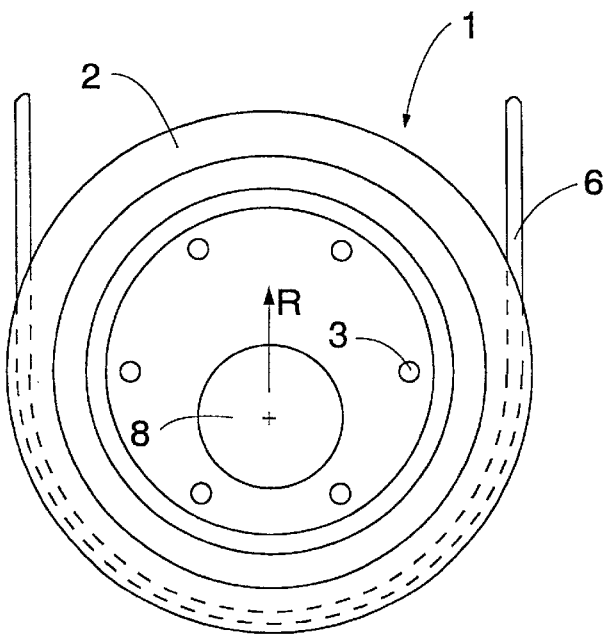
Figure 5:
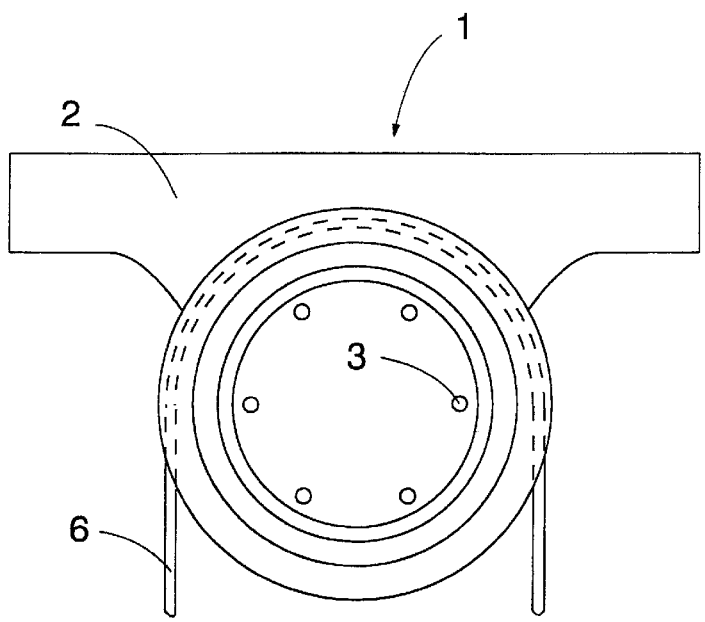
Figure 6:
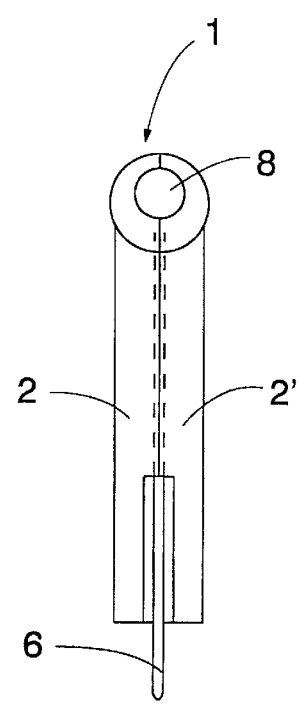

The invention will be described in closer detail in the accompanying drawings, in which FIG. 1 is a schematic side view of a first embodiment of a rope pulley construction of the invention, FIG. 2 is a schematic and sectional front view of the embodiment of the rope pulley construction of FIG. 1, FIG. 3 is a schematic and sectional front view of a detail of a second embodiment of the rope pulley construction of the invention, FIG. 4 is a schematic side view of a third embodiment of the rope pulley construction of the invention, FIG. 5 is a schematic side view of a fourth embodiment of the rope pulley construction of the invention, and FIG. 6 is a general, schematic front view of the rope pulley construction of FIG. 5.

FIG. 1 is a schematic side view of a rope pulley construction 1 of the invention and FIG. 2 is a sectional view of the rope pulley construction 1 of FIG. 1 taken along line A—A. The rope pulley, construction 1 comprises a frame comprising two identical plate parts 2 and 2' joined together. The plate parts 2 and 2' may also be different but the plate parts 2 and 2' are preferably identical. The plate parts 2 and 2' can be made of metal by pressing against a suitable mold or by casting, for example. The plate parts 2 and 2' can also be manufactured by joining several separate pieces together, but both plate parts 2 and 2' are preferably manufactured of one piece. In the case shown in FIG. 1, the plate parts 2 and 2' are joined together by suitable fixing parts, which are preferably screws, to be arranged through openings 3. The plate parts 2 and 2' can also be attached to each other by spot welding or by utilizing another fixing method. The rope pulley construction 1 further comprises a rope pulley 4 comprising a rope groove 5 for a lifting rope 6. The rope pulley construction 1 may comprise several rope pulleys 4. The rope pulley construction 1 may further comprise a rope pulley bearing 7. The rope pulley 4 and the bearing 7 are fixed together by a fit, for example. The rope pulley construction 1 still further comprises a preferably circularly symmetric, opening-like suspension point 8 on which a suspension shaft or another suspension part can be supported in order to hang the rope pulley on part of the hook block construction, frame or trolley of the hoisting apparatus, for example. The rope pulley construction 1 may also comprise several suspension points 8, which may differ in shape. In FIG. 1, the suspension point 8 is located inside the bearing 7, i.e. inside the rim of the bearing 7, symmetrically in the center of the bearing 7, but the suspension point 8 may also be located in many different ways. FIG. 2 shows how the joined plate parts 2 and 2' simultaneously provide the suspension for the rope pulley 4 and its bearing, the suspension point 8 for supporting the fixing shaft of the hook block, for example, on the rope pulley construction 1, as well as a guard 9 to prevent the lifting rope 6 from coming off the rope groove 5 of the rope pulley 4. Preferably, the guard 9 extends over more than half of the rim of the rope pulley.

FIG. 3 is a schematic and sectional front view of a detail of a second rope pulley construction 1 of the invention. In the rope pulley construction 1 of FIG. 3, the rope pulley 4 and the bearing 7 are joined together such that the rope groove 5 is arranged directly on the outer rim of the bearing 7.

FIG. 4 is a schematic side view of a third embodiment of the rope pulley construction 1 of the invention. In the rope pulley construction 1 of FIG. 4, the suspension point 8 is located inside the bearing 7, asymmetrically with respect to the center of the bearing 7. On the basis of a resultant force R of the rope force shown in FIG. 4, it can be seen that when the suspension point 8 is placed according to FIG. 4 asymmetrically below the center of the bearing 7, a stable construction is achieved when, for example, the shaft of the hook block is hung at the suspension point 8.

FIG. 5 is a side view of a fourth rope pulley construction 1 of the invention and FIG. 6 is a general front view of the rope pulley construction 1 of FIG. 5. In the rope pulley construction 1 of FIGS. 5 and 6, the plate parts 2 and 2' are shaped such that the suspension point 8 is located outside the bearing 7, i.e. outside the rim of the bearing 7, at the upper part of the rope pulley construction 1 such that an imaginary axle traveling through the suspension point 8 is situated orthogonally to an imaginary axle traveling through the bearing 7 of the rope pulley construction 1. The imaginary axles traveling through the bearing 7 and the suspension point 8 can also be situated at other than right angles with respect to each other. The shape of the rope pulley construction 1 shown in FIGS. 5 and 6, i.e. the plate parts 2 and 2', is not circularly symmetrical, so the shape thereof can be chosen freely. The position of the suspension point 8 outside the bearing 7 can also be chosen freely, but when the suspension point 8 is located outside the bearing 7, the suspension point 8 is preferably located at the upper part of the rope pulley construction 1.

The drawings and the related description are only intended to illustrate the idea of the invention. In its details, the invention may vary within the scope of the claims. Hence, the suspension point 8 does not have to be circularly symmetrical but its shape can be chosen freely. Neither does the shape of the rope pulley construction 1 necessarily have to be circularly symmetrical but its shape can also be chosen freely according to the shape of the plate parts 2 and 2'.

What is claimed is:

1. A rope pulley construction comprising at least one rope pulley equipped with a rope groove, rope pulley bearing, and a frame, the frame comprising two plate parts joined together such that the joined plate parts provide suspension for the rope pulley, at least one suspension point of the rope pulley construction and guard being arranged to prevent the lifting rope from coming off the rope pulley, the suspension point having an axis at an angle to an axis through the rope pulley bearing.

2. A rope pulley construction as claimed in claim 1, wherein the plate parts are identical.

3. A rope pulley construction as claimed in claim 1, wherein both plate parts are manufactured of one piece.

4. A rope pulley construction as claimed in claim 1, wherein the rope pulley and the bearing are combined such that the rope groove is arranged on an outer rim of the bearing.

5. A rope pulley construction as claimed in claim 1, wherein the suspension point is located outside the bearing.

6. A rope pulley construction as claimed in claim 5, wherein the suspension point is located at an upper part of the rope pulley construction.

7. A rope pulley construction, comprising at least one rope pulley equipped with a rope groove, rope pulley bearing, and a frame, the frame comprising two plate parts joined together such that the joined plate parts provide suspension for the rope pulley, at least one suspension point of the rope pulley construction and guard being arranged to prevent the lifting rope from coming off the rope pulley; wherein the at least one suspension point is located inside the bearing.

8. A rope pulley construction as claimed in claim 7, wherein the suspension point is located asymmetrically with respect to the center of the bearing.

9. A rope pulley construction as claimed in claim 8, wherein the suspension point is located below the center of the bearing.

10. A rope pulley construction as claimed in claim 5, wherein the suspension point is circularly symmetrical.

11. A rope pulley construction as claimed in claim 7, wherein the plate parts are identical.

12. A rope pulley construction as claimed in claim 7, wherein both plate parts are manufactured of one piece.

13. A rope pulley construction as claimed in claim 7, wherein the rope pulley and the bearing are combined such that the rope groove is arranged on an outer rim of the bearing.

14. A rope pulley construction comprising:
   a frame including two plate parts joined together;
   a rope pulley including a rope groove and a rope pulley bearing;
   a guard to prevent the lifting rope from coming off the rope pulley;
   at least one suspension point for the rope pulley construction located inside the rope pulley bearing;
   said two plate parts being joined to hold said rope pulley, to form said at least one suspension point and to form said guard.

15. A rope pulley construction according to claim 14, said two plate parts having an outer portion and an inner portion;
   said outer portion having said plate parts spaced apart for receiving said rope pulley; and
   said inner portion having said plate parts in contact with each other.

16. The rope pulley construction according to claim 15, wherein said inner portion includes an opening surrounded by an axially extending portion to form said suspension point.

17. The rope pulley construction according claim 15, wherein an outer end of said two plate parts are bent to form said guard as an outer edge to said outer portion.

* * * * *